H. J. GENSKE.
THISTLE PULLER.
APPLICATION FILED MAR. 13, 1918.
1,288,559.
Patented Dec. 24, 1918.
4 SHEETS—SHEET 3.
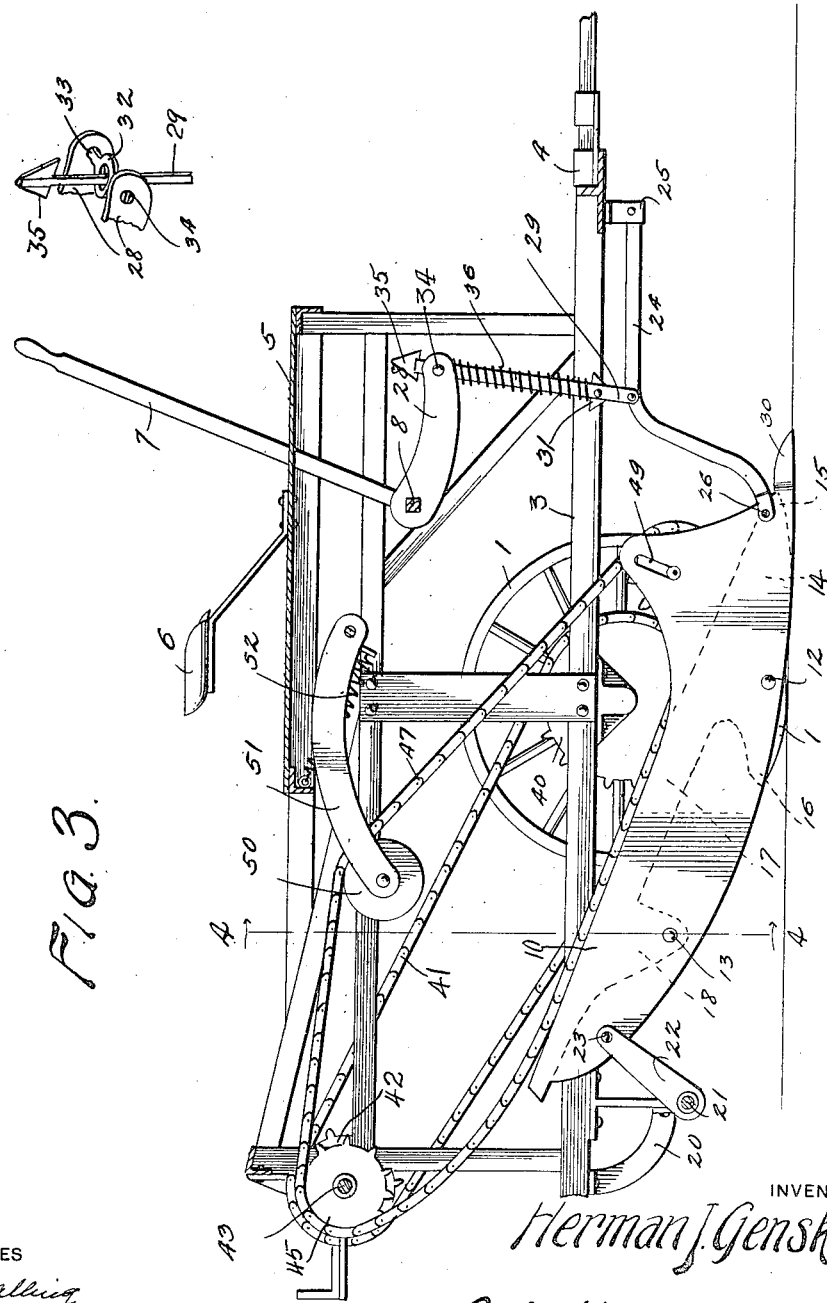
INVENTOR
Herman J. Genske
WITNESSES
BY
ATTORNEY

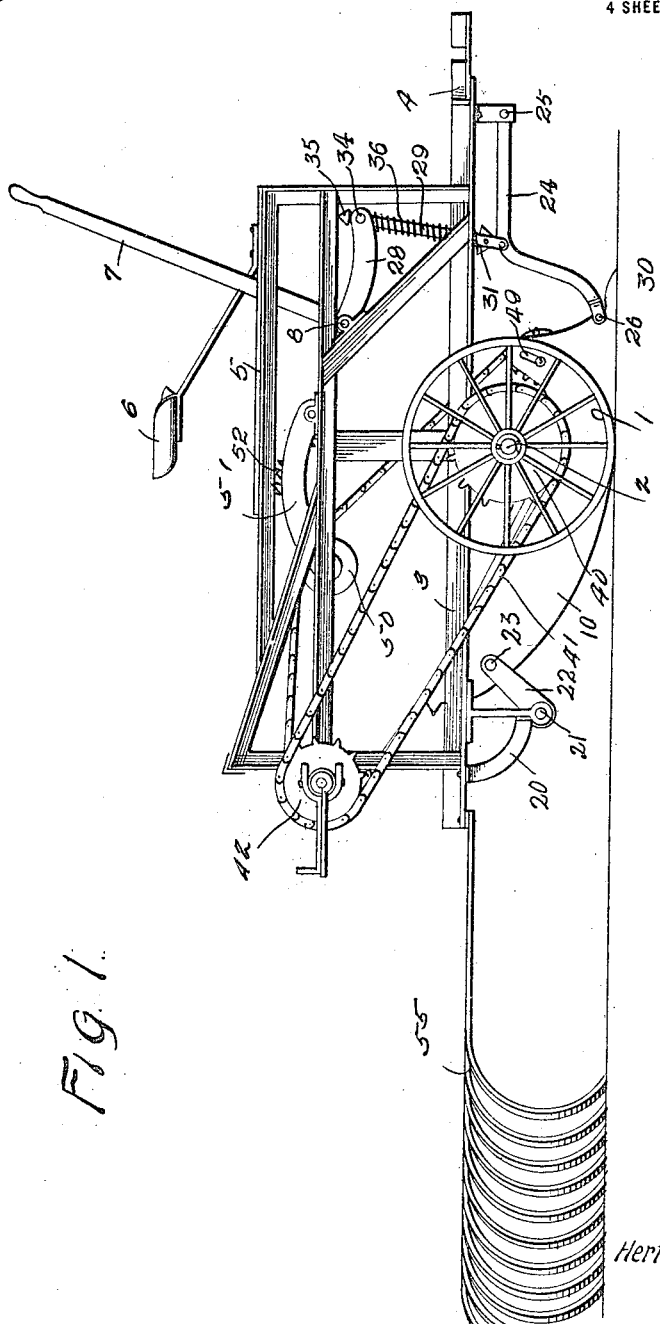

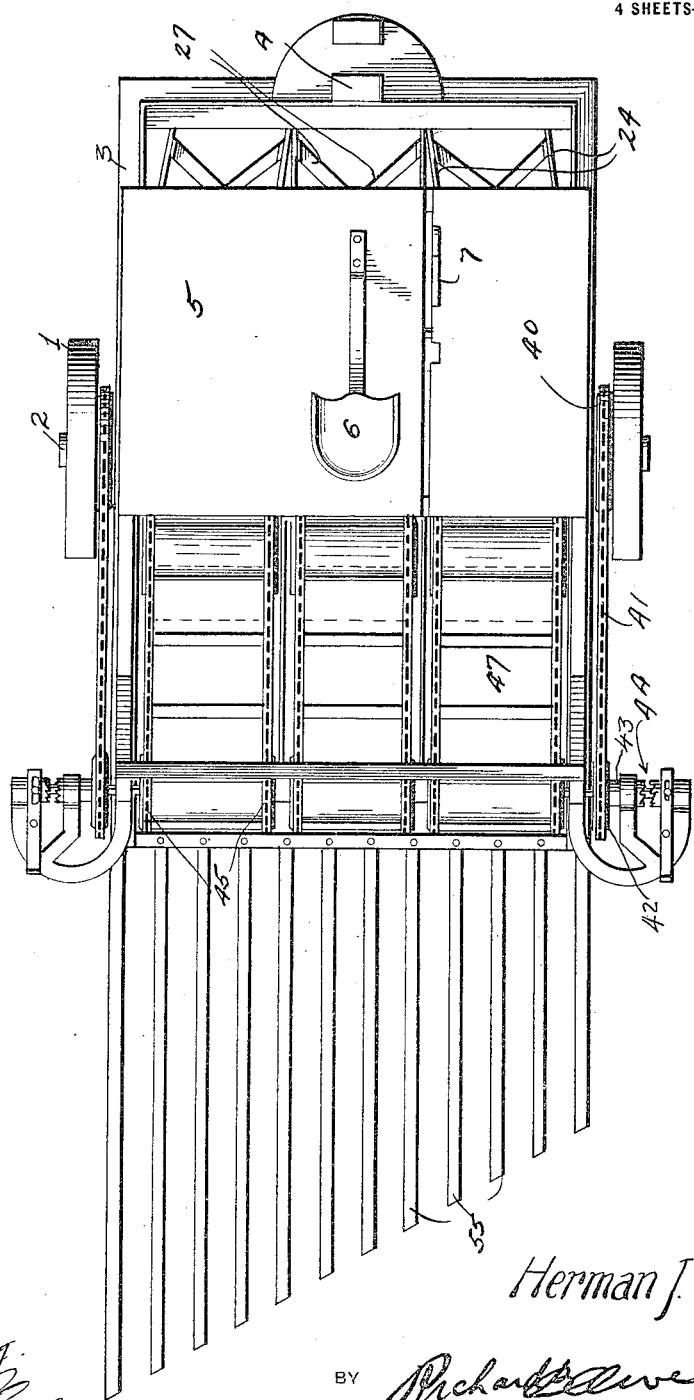

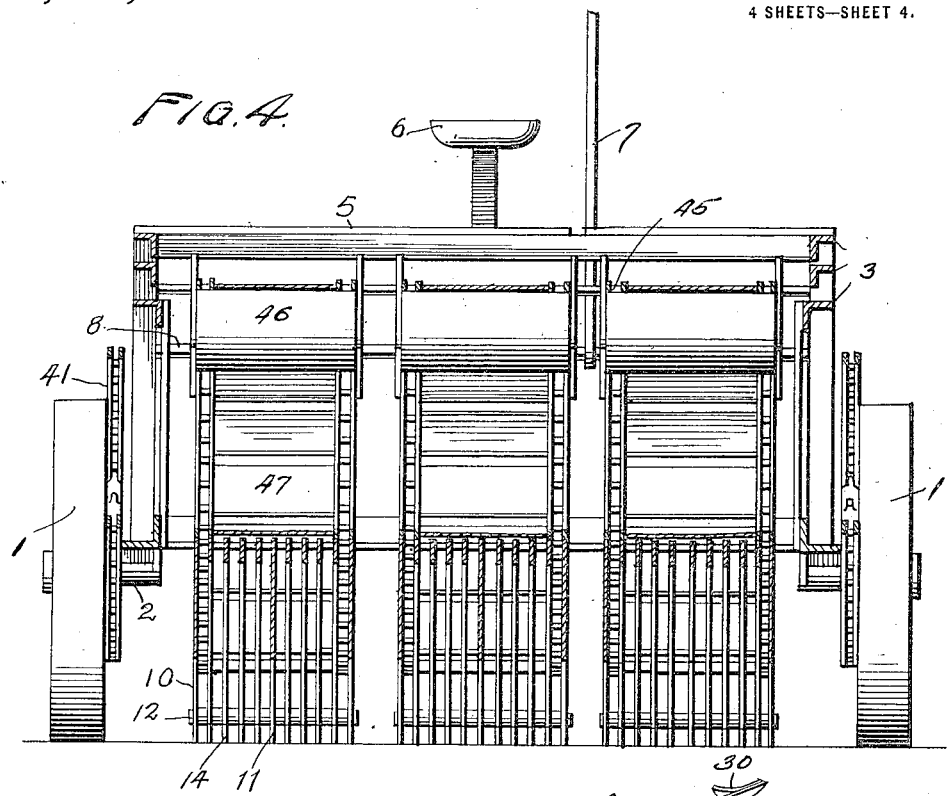
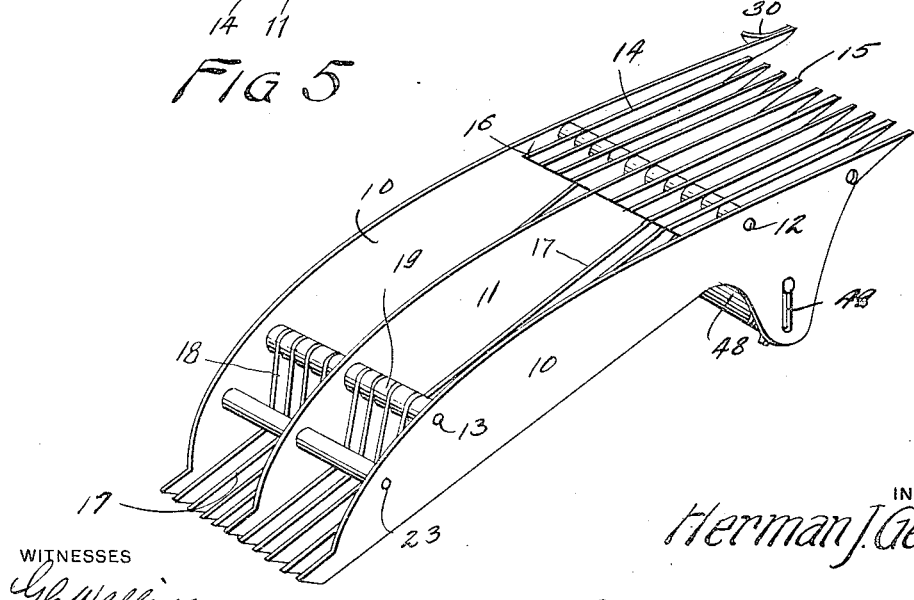

UNITED STATES PATENT OFFICE.

HERMAN J. GENSKE, OF HILBERT JUNCTION, WISCONSIN.

THISTLE-PULLER.

1,288,559.  Specification of Letters Patent.  Patented Dec. 24, 1918.

Application filed March 13, 1918. Serial No. 222,203.

*To all whom it may concern:*

Be it known that I, HERMAN J. GENSKE, a citizen of the United States, residing at Hilbert Junction, in the county of Calumet and State of Wisconsin, have invented certain new and useful Improvements in Thistle-Pullers, of which the following is a specification.

I have called this invention a thistle puller because that is the purpose for which I have devised the machine and the use to which it has thus far been put, but it is quite possible that it could be employed to gather beans and other plants from vines which are harvested by pulling their roots or the major portion of their roots out of the ground, along with the tubers thereon, or with the tops and the vegetables or berries thereon, and delivering the whole to a suitable point or leaving them in a row across the field, so that they may be picked up later.

The purpose of the machine is thus pretty well stated. The construction involves a wheeled framework within which is mounted a plurality of sections, each having a series or gang of pulling or plowing members, and a carrier or conveyer working in conjunction with each section to handle the plants pulled from the ground. Also gathering mechanism trails behind the machine to collect and leave the plants in rows across the field. Finally there are control levers for adjusting the height of the various sections and for throwing them into and out of action, and other details of construction and operation, all of which are more fully brought out in the following specification and shown in the drawings herewith and in which:—

Figure 1 is a side elevation of this machine complete,

Fig. 2 is a plan view thereof,

Fig. 3 a longitudinal sectional view on a larger scale, omitting the gathering mechanism, Fig. 4 a transverse section on the line 4—4 of Fig. 3, and Fig. 5 an inverted perspective view of one of the sections.

Fig. 6 is a perspective detail of the stop at the upper end of one of the links.

Main wheels 1 are mounted on stub axles 2 on a framework 3, and the whole may be drawn by a tractor or a team attached at 4. Over the forward portion of the framework is a platform 5, and mounted thereon is a driver's seat 6, adjacent which is a main lever 7 which rises from a rock shaft 8 extending transversely across the machine beneath the platform 5.

Within this skeleton framework structure thus supported and thus described are mounted several duplicate sections disposed side by side, and in the drawings herewith I have shown a machine having three such sections although there may be less than three and there probably would be more than three. Each section is made up of a pair of side plates 10, a partition plate 11 midway between them, through bolts 12 and 13 connecting the three plates near their front and rear ends respectively, and a gang of diggers disposed between the plates and held spaced from each other in a manner yet to appear, each digger having the outline indicated in dotted lines in Fig. 3. That is to say, the digger has a shoe or foot 14, preferably having a straight lower edge extending from its sharp toe 15 rearward to its rather sharp heel 16, and from the foot a body portion 17 inclines rearwardly and upwardly, its upper edge being coincident with the upper edges of the side plates 10 and the partition 11. Near its rear end the body has a pendent element which we might call a tail 18, and the tails of the several diggers are mounted on the rear bolts 13 between spacing elements or collars 19 as best seen in Fig. 5. Similar spaces may be used on the front bolts 12 as also shown in this view. In rear of the pendent tail 18 the body continues obliquely upward, and the upper edges of the bodies of all these diggers and of the several plates, spaced as they are by the elements 19, constitute a grid or grate upon which and along which the plants pulled or dug from the ground by the toes 15 must slide, during which action much of the dirt therein is sifted out and dropped onto the ground.

Brackets 20 hang from the main frame and carry a cross bar 21, and links 22 connect this bar with each section, the latter having a bolt 23 on which the upper ends of the links are mounted. At the forward end of the framework a pair of bent levers 24 is pivoted at 25 therein, their rear ends being turned downward and pivotally connected at 26 with the section as best seen in Fig. 3. These two levers are braced as shown at 27 in Fig. 2 so that they will swing in unison, and each is connected at its bend by a link 29 with a pair of arms 28 projecting rigidly forward from the rock shaft 8 as best seen in Fig. 3. When the main lever 7 is moved to rock this shaft, the arms 28 rise and fall and the links 29 cause the levers 24 to swing around their pivots 25, so that the front end of each section is raised and lowered as its link supports 22 at the rear end permit. For digging purposes the front extremity of one of the side plates 10 may be provided with a sharp point or share indicated at 30, and I reserve considerable latitude in this respect and in respect to the shape of the toes 15 of all the elements, according to the character of the ground and the nature of the plants to be dug or pulled. In some cases the toes may travel upon or very near the earth surface, but in most cases they will probably travel a little below the same.

In order to permit a certain yielding motion so that the parts will not become broken in case the machine strikes an obstruction, I may provide each link with a fixed cross pin and stop 31 at its lower end, and project its upper end through the eye 32 of a rocking piece 33 having trunnions 34 pivotally mounted in the two crank arms 28, the upper extremity of the link 29 having a cross pin or stop 35 as best seen in Fig. 6. There is coiled on the link between the stop 31 and the rocking piece 33 an expansive spring 36, and the result is that the parts normally stand as seen in Fig. 3, but if any element or section should be raised suddenly by encountering some obstruction, the spring will permit a certain amount of yielding as the link or rod 29 is pushed up through the eye 32. At other times the expansion of this spring will cause the stop 35 to rest on the rocking piece 33, so that the arms 28 sustain the weight of the front end of the digger at any height to which it is set by means of the hand lever 7.

The hub of each main wheel carries a sprocket 40 from which a sprocket chain 41 leads to a sprocket 42 whose hub is loosely mounted on a cross shaft 43 at the rear end of the main frame, and a manually operated clutch 44 is employed as shown in Fig. 2 to throw this sprocket wheel into connection with the shaft when the latter is to be driven by the turning of the main wheels. Said shaft carries at various points throughout its length pairs of sprocket wheels 45 at the extremities of rollers 46 and over these sprockets run chains while over the rollers run belts and slats forming part of endless carriers 47 as shown. The forward ends of these belts run over similar rollers 48 whose trunnions are movably mounted in slots 49 in the side plates 10 as best seen in Figs. 3 and 5. The lower stretch of each carrier moves to the rear along the straight upper edges of the gang of plates constituting a digger, while the upper stretch moves forward over a belt tightener 50 consisting of a roller mounted between pivoted arms 51 and held normally raised by a spring 52, and thence downward to the forward roller 48. By this means whatever plants are pulled or dug from the ground are carried or slid upward over the diggers by the upward movement of the lower stretches of the carriers, and during their course the dirt is dropped off the plants and more especially off the roots and tubers so that the same are pretty well cleansed at the time they are delivered at the rear ends of the diggers. Here they might fall into a receptacle if it were desired to collect them at that point, although I contemplate dropping them again onto the ground and collecting them in rows by means of a gatherer of appropriate type. As shown in Fig. 1, this consists of a series of spring rake teeth 55, their forward ends disposed obliquely across the series as best seen in Fig. 2. These rake teeth will therefore gather the plants dropped by the diggers and convey them to one side, leaving them in a row across the field so that they may be raked up or otherwise collected by a subsequent operator whenever desired. As first suggested, this machine may be used for pulling thistles or plants, or for digging according as the diggers are set.

What is claimed as new is:—

1. The herein described digger comprising upright side plates and an intermediate partition plate, through bolts connecting them at their front and rear ends, a series of spacers strung on said bolts, and a series of digger plates strung on the same bolts between the spacers, the upper edges of all plates being coincident throughout the major portion of their length, and the lower edges of the digger plates being formed with a foot at their front end and a tail at their rear end, both standing within the contour of the side plates, for the purpose set forth.

2. In a machine of the type described, the combination with a digging element comprising side and intermediate plates, through bolts connecting them at their front and rear ends, a series of spacers strung on said bolts, and a series of digger plates strung on said bolts between said spacers, the upper edges of all said plates being substantially coincident; of an endless carrier whose lower stretch moves along said upper edges to the rear, and means for supporting said digging element with its front end at or beneath the level of the ground.

3. The herein described digging element comprising side plates and an intermediate partition plate, through bolts connecting their front and rear ends, and a series of digging plates spaced from each other and disposed between the side plates and each comprising a straight body whose upper edge is substantially coincident with the upper edges of the other plates, a foot at the front end of the body having a sharp toe and a defined heel, and a pendent tail near the rear portion of said body strung on said rear bolts.

In testimony whereof I affix my signature in presence of two witnesses.

HERMAN J. GENSKE.

Witnesses:
   JOHN J. MADLER,
   JOSEPHINE M. JACQUET.

Copies of this patent may be obtained for five cents each, by addressing the "Commissioner of Patents, Washington, D. C."